United States Patent [19]

Beardsley et al.

[11] Patent Number: 5,235,690
[45] Date of Patent: Aug. 10, 1993

[54] METHOD FOR OPERATING A CACHED PERIPHERAL DATA STORAGE SUBSYSTEM INCLUDING A STEP OF SUBSETTING THE DATA TRANSFER INTO SUBSETS OF DATA RECORDS

[75] Inventors: Brent C. Beardsley; Michael T. Benhase; Gail A. Spear; William D. Williams, all of Tucson, Ariz.

[73] Assignee: International Business Machines Corporation, Armonk, N.Y.

[21] Appl. No.: 575,716

[22] Filed: Aug. 31, 1990

[51] Int. Cl.$^5$ .............................................. G06F 13/10
[52] U.S. Cl. .................................. 395/425; 364/238.4; 364/243.2; 364/243.41; 364/260.1; 364/DIG. 1
[58] Field of Search ............................. 395/425, 400; 364/200 MS File, 900 MS File

[56] References Cited

U.S. PATENT DOCUMENTS

| | | | |
|---|---|---|---|
| 4,198,681 | 4/1980 | Furr, Jr. .................. | 395/425 |
| 4,467,421 | 8/1984 | White ........................ | 395/425 |
| 4,489,378 | 12/1984 | Dixon et al. ............... | 395/425 |
| 4,499,539 | 2/1985 | Vosacek ..................... | 395/425 |
| 4,571,674 | 2/1986 | Hartung ..................... | 395/425 |
| 4,603,380 | 7/1986 | Easton et al. .............. | 395/425 |
| 5,133,060 | 7/1992 | Weber et al. .............. | 395/425 |

Primary Examiner—Joseph L. Dixon
Assistant Examiner—Hiep T. Nguyen
Attorney, Agent, or Firm—Herbert Somermeyer

[57] ABSTRACT

The peripheral cache DASD subsystem is connected to predetermined host processors. A channel connection between the host processor and the peripheral subsystem has a much higher burst rate then the burst data transfer rate of a DASD while having an extended signal propagation time preventing rapid exchanges of interactive control signals. The branch write occurs in that data is written both to the DASD and to the cache simultaneously. The write domain is established in the subsystem by the host processor as a number of records to be written on the DASD only after the available cache space is compared with a needed cache space for the entire write domain. Whenever the available cache space is less than the write domain needs, then the peripheral cache DASD subsystem subsets the data transfer into a plurality of subset data transfers each having data storable in the available cache data storage space. Calculations for determining the maximum cache space are described and sets of machine operations are disclosed for effecting the above operations.

11 Claims, 3 Drawing Sheets

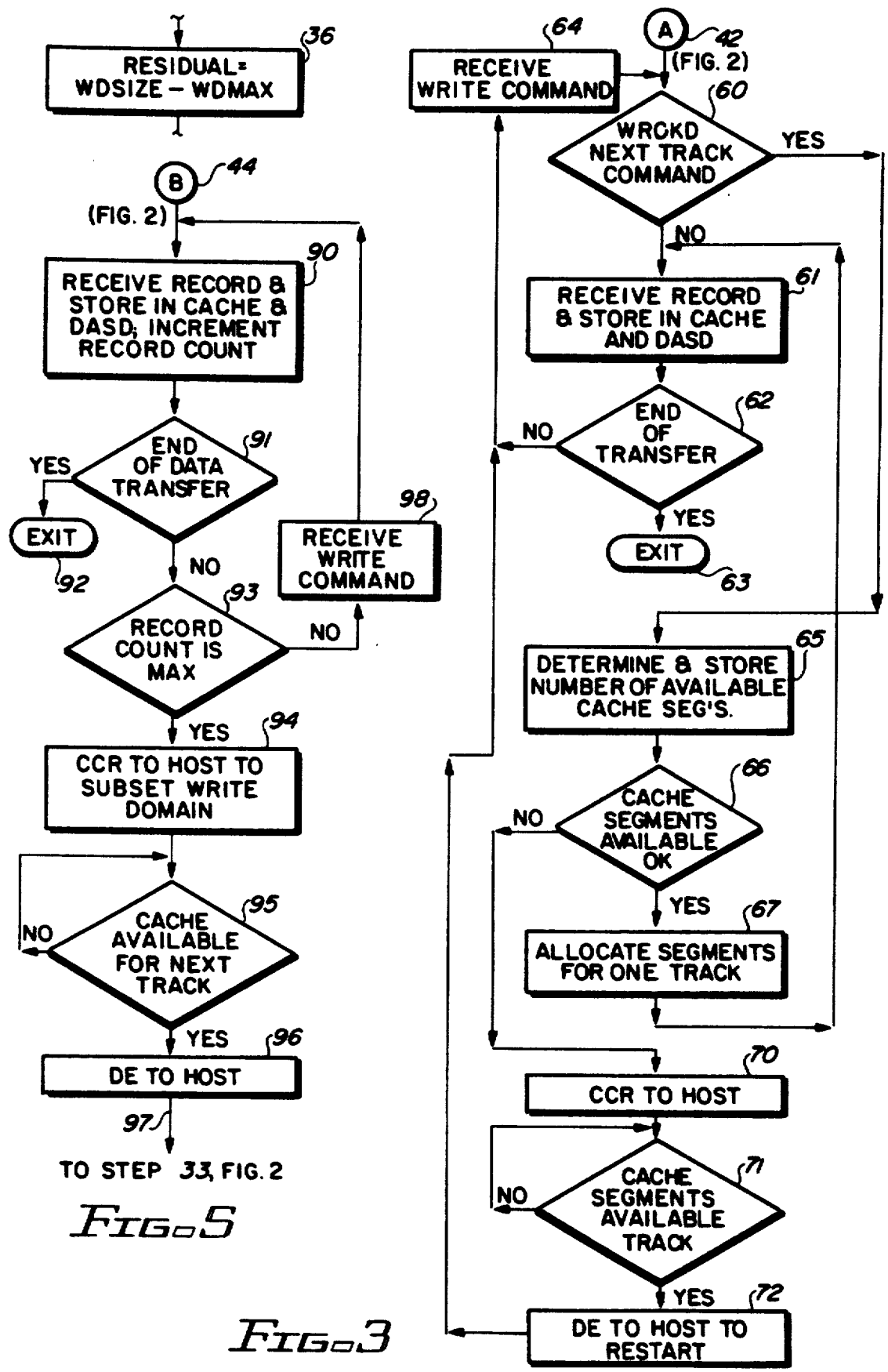

METHOD FOR OPERATING A CACHED PERIPHERAL DATA STORAGE SUBSYSTEM INCLUDING A STEP OF SUBSETTING THE DATA TRANSFER INTO SUBSETS OF DATA RECORDS

FIELD OF THE INVENTION

The present invention relates to data processing subsystems, particularly to a DASD data storage subsystems having a large cache and being connected to a host processor via a channel having a higher data rate than the peripheral device.

BACKGROUND OF THE INVENTION

Peripheral data storage systems attached to large scale host processors employ direct access storage devices (DASD) which usually take the form of rotatable magnetic memory devices. For enhancing the performance a large random access memory cache is selectably interposed between the host processor and the DASD for enhancing the rate of data transfer between the host processor and the peripheral subsystem. That is, the cache tends to mask the latency delays of a DASD. Algorithms have been developed for handling the relationship between the host processor, the cache and the DASD; without such algorithms intervention of the cache could degrade the performance. Performance and integrity problems are always of concern. New controls and procedures are needed. Machine operations have been devised to solve these problems for those situations in which the data burst rate of the channel connecting the host processor to the peripheral subsystem approximates the burst data rate of the DASD. When a channel is used between the host processor and the peripheral subsystem which has a greater burst data rate then the DASD, other algorithms and controls are required for ensuring high performance while maintaining data and system integrity. A further problem is that the length of the channel cable between the host processor and peripheral subsystem is being made longer which means that the signal propagation time is increasing. With increased data rates, such increased signal propagation delays provide a significant decrease in performance when a number of control signals which cannot be overlapped in time have to be exchanged between the host processor and the peripheral subsystem.

It is common practice in cached peripheral subsystems to provide a so called "branching write". Such an operation transfers data from the host processor simultaneously to the DASD and to the cache. The control unit or controller allocates a new set of cache storage segments (a segment is an allocatable unit of storage within the cache) when the DASD switches from one track to another track that is not currently stored in the cache. If the cache is sufficiently full, there may be insufficient cache segments available for storing data for the upcoming track, particularly when it is time for the subsystem to switch from the current track to a next track. In the prior art, peripheral controllers effect track switching when not enough cache segments are available, cause a channel command retry (CCR), a known way of a peripheral controller communicating to a host processor. This communication indicates a delay in the upcoming data transfer and to resend the current command. The system waits for cache segments to become available. Then the peripheral controller reconnected to the channel for continuing with the branching write.

Newer peripheral subsystems operate in a so-called non-synchronous mode in which the peripheral subsystem accepts data from the host processor for writing to cache and DASD and presents ending status to each command causing the transfer of data even though such received data is not in fact written to the DASD. Accordingly, when the subsystem process determines that a track switch is necessary and determines that insufficient number of cache segments are currently available further data is not received until after the CCR. At the time the CCR is sent to the host processor the peripheral subsystem may have already accepted data from the host processor for the upcoming track and already presented ending status to the host processor, i.e., indicating that the data is in fact stored on the DASD. The CCR ensures data integrity while not dedicating the channel to the one data transfer, i.e., such dedication decreases the channel utilization and thereby degrades total data processing system operation. A data integrity problem can occur if the channel, when dedicated, experienced a failure of some type with a result of loss of data in the peripheral subsystem. It should be remembered that peripheral data subsystems when supplying ending status to a host processor are in effect stating to the host processor that the received data is retentively stored in the peripheral subsystem. It is desired to provide an efficient and complete solution to the problem described above.

DISCUSSION OF THE PRIOR ART van Es U.S. Pat. No. 4,040,027 shows controlling a buffer memory for indicating available memory space. Data transfer is from a first memory to a user device through a temporary storage and an intermediate second buffer memory. The system includes a measuring device which determines the extent to which the second or buffer memory is filled with information brought out by the first memory while the information is being transferred to the user device from the second memory. Upon detecting a predetermined first degree of filling, the measuring device produces a first alarm signal which after a given delay temporarily blocks further readout of information from the first memory, i.e., interrupts the data transfer. After measuring a predetermined second degree of filling of the second or buffer memory, the measuring device produces a second alarm signal after which a given second delay enables resuming the readout of information from the first memory to the second or buffer memory. This patent is cumulative to the discussion in the background of the invention represents a synchronous solution which is not adaptable for efficient use with a high speed channel having long control signal delays.

Bigelow, et al. U.S. Pat. No. 4,298,954 shows a buffer storage apparatus with two buffers alternating between receiving and supplying data signals. The buffer functions are alternated between the two buffers such that when one of the buffers is empty another one of the buffers has received a predetermined number of signals even though that data receiving buffer is not yet full. When data is transferred in blocks of data bytes, switching between the buffers occurs on predetermined adjust boundaries of the data blocks. Alternation of function between the buffers occurs at any one of a plurality of address boundaries within the data receiving buffers by using a plurality of such buffer storage apparatus to connect individual "data burst" units, such as a host processor and a data storage unit. Each data burst unit has a high speed buffer access to effect data transfer. Again, this refers to the mode where there is short response time in control signals.

Hartung, et al. in U.S. Pat. No. 4,583,166 shows a cached peripheral data storage subsystem employing direct access storage devices (DASD). This patent is cited as background for cache data storage systems. Hartung in U.S. Pat. No. 4,571,674 shows another cached data storage subsystem in which a slow speed channel is connected through a data buffer to a DASD which has a higher burst rate than the slow speed channel. The cache provides two services, one for caching data for fast channels and for rate changing buffering for the slow channels. Neither of the above references address the data integrity and system integrity problems associated with high speed channels having long response times because of signal propagation delays.

International Business Machines Corporation (IBM) in its publication GC26-4519-0, available from IBM as of January, 1990, compares non-synchronous DASD operations with synchronous DASD operations. Extended Count Key Data (ECKD) access commands are also described in this publication. Such data-access commands are usable in the preferred embodiment of this invention, such as the commands DEFINE EXTENT and LOCATE RECORD. This IBM publication is cited as background information to fill out the discussion of the prior art. This IBM publication does not described operation of a cached DASD subsystem that is designed to operate in the non-synchronous mode.

SUMMARY OF THE INVENTION

In accordance with the invention, a method of operating a cached DASD peripheral subsystem includes the steps of receiving an indication of an upcoming updating write operation. The indication includes a domain of a file to be written to the DASD and to its cache. An amount of available free cache space is measured by allocating cache space to the records within the write domain. As the size of the write domain is limited by the availability of the cache storage space, the domain can be subsetted for enabling maximum data transfer without creating data integrity exposures. At track switching time, the number of cache segments available is again checked to ensure that at least one track of DASD may be stored in the cache for accommodating track switching delays and the high speed data transfers from a host processor.

In another aspect of the invention, an update write operation, i.e., a file is being updated by a host processor, a maximum possible cache requirement is calculated. During the data transfer, the calculated maximum cache requirements are adjusted in accordance with the data fragmentation on a DASD such that the availability of cache storage space is maximized for all purposes of the peripheral subsystem. In a format write, the calculation of the available cache segments occurs at each track switch event.

A transfer length factor (TLF) for the data is generated as by a host processor and which includes a measurement of one record of the data in a file with a write domain indicating a number of records. The maximum number of storage spaces or segments in cache is determined for controlling the data transfer between the host processor and the DASD.

The foregoing and other objects, features and advantages of the invention will be apparent from the following more particular description of preferred embodiments of the invention, as illustrated in the accompanying drawings.

DESCRIPTION OF THE DRAWINGS

FIG. 3 is a simplified flow chart showing operation of the FIG. 1 illustrated system during a format write operation.

FIG. 5 is a machine operations flow chart illustrating subsetting a data transfer between a host processor and a device for accommodating a smaller number of cache segments less than a maximum number of cache segments required for the data transfer.

DETAILED DESCRIPTION

Figure 1:
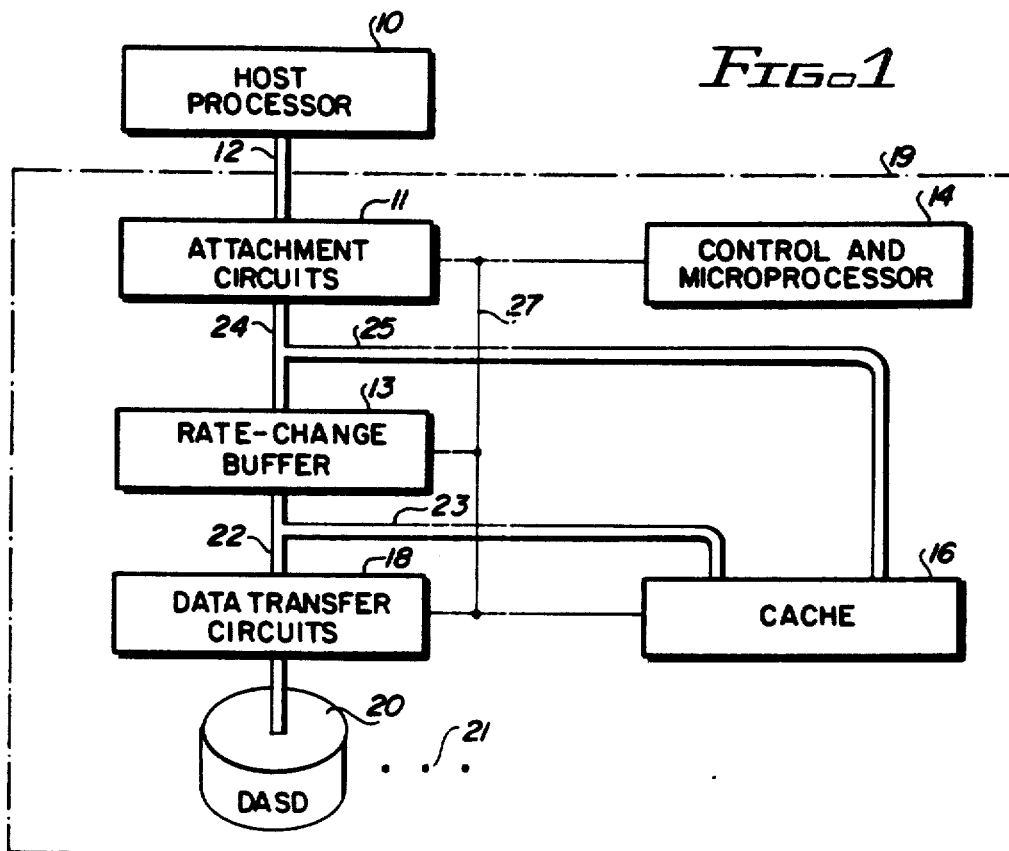
FIG. 1 is a simplified block diagram showing a peripheral data storage subsystem connected to a host processor in which the present invention is advantageously employed.

Referring now more particularly to the appended drawing, like numerals indicate like parts and structural features in the various figures. A host processor 10 is connected via an optical fiber channel 12 to a peripheral subsystem 19 consisting of attachment circuits 11, a rate-changing buffer 13, a control and microprocessor (hereafter microprocessor) 14, cache 16, data-transfer circuits 18 and a plurality of DASDs 20, 21. The channel 12 may exist between a plurality of host processors 10 and a plurality of peripheral subsystems, many of which can be data storage subsystems and others can be other types of peripheral subsystems. A characteristic of the connection 12 is that the burst rate of data transfers is much greater than the burst data transfer rate of a DASD 20, 21 and that the signal propagation time along the optical fiber between host processor 10 and the peripheral subsystem is substantial. The signal propagation time, dependent on the length of the connection, prevents interactive control of the data transfer on a real time basis. That is, the elapsed time it takes DASD 20 to scan a gap previously used for exchanging control signals between a host processor 10 and a peripheral data storage subsystem 19 is now less than the two-way signal-propagation time of the channel connection 12. Such a disparity in data transfer rates and signal propagation times creates data integrity and system integrity exposures. Writing operations i.e., transfer of data from host processor 10 to DASD 20, include so-called branch write operations. Data transferred through attachment circuits 11 from host processor 10 are supplied through a rate-changing buffer 13 through data transfer circuits 18 for retentive recording on DASD 20. The long term data rate is determined by the data rate of DASD 20. Extended count key data (ECKD) control architecture of International Business Machines Corporation provides for accommodating a burst data transfer of several records without intervening reading control data structures of DASD 20. When writing data to a DASD, a copy of the written data is also stored in cache 16. This operation is termed branching. The cache copy enables machine operations subsequent to the writing data to DASD 20 to be conducted between host processor 10 and subsystem 19 at electronic speeds. In branching, the data is not only transferred over buses 24 and 22 through rate-changing buffer 13 and data transfer circuits 18, but also over bus 23 for storage in available cache segments of cache 16. Similarly, on a read operation, a branching read may occur in that data read from DASD 20 supplied through data transfer circuit 18 not only are transferred to host processor 10 through rate changing buffer 13 but also may be stored in cache 16 via cable or bus 23. All of the operations described above are controlled and sequenced by microprocessor 14 which supplies control signals to and receives data signals from all of the elements of the peripheral subsystem over a set of electronic connections collectively denominated by numeral 27. Such operations include the update write controls and a format write controls described in this specification.

Figure 2:
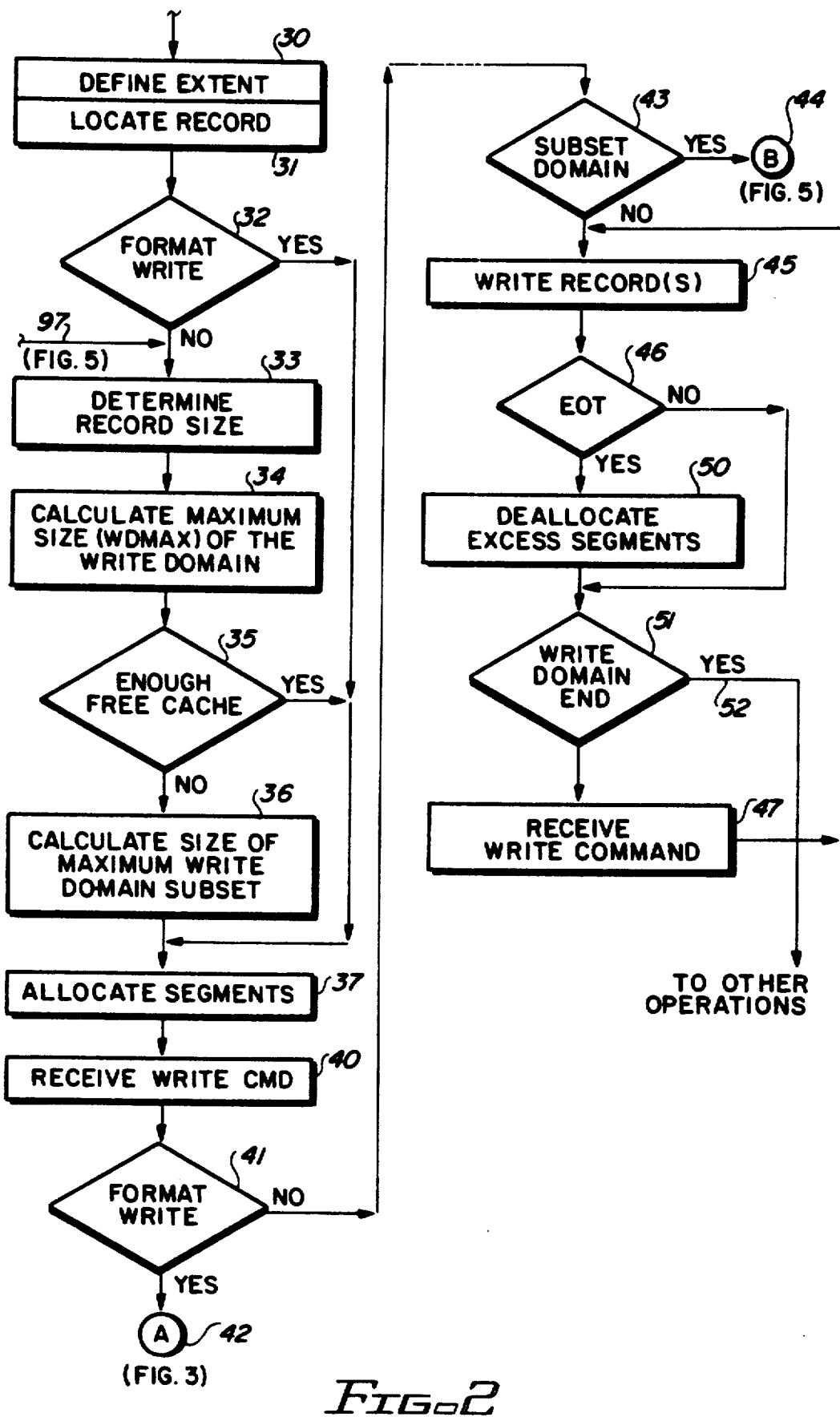
FIG. 2 shows a simplified set of machine operations of the FIG. 1 illustrated system for practicing the present invention in its best mode.

Referring next to FIG. 2, the machine operations flow chart illustrates the control exercised by microprocessor 14 over the peripheral subsystem in response to host processor 10 supplied commands. In a constructed embodiment of the invention, command chaining is used between host processor 10 and the peripheral subsystem of FIG. 1. Command chaining is a known input-output control mechanism used by International Business Machines Corporation for many years. The flow charts herein reflect the use of command chaining.

The first commands in a chain (FIG. 2) consists of two channel commands from host processor 10 which includes a DEFINE EXTENT command 30 which limits the peripheral subsystem 19 to an address range on DASD 20 in which the file to be processed in the ensuing command chain resides. DEFINE EXTENT command 30 may also include a so called file mask which allows and inhibits certain types of writing operations in the ensuing commands such as inhibiting the later discussed format write, inhibiting an update write, inhibiting a cylinder seek, allowing writing a home address or control record on the DASD 20 and other controls beyond the scope of the present description. The DEFINE EXTENT command also indicates the block size, the beginning of the extent, i.e., the beginning address, and the ending address of the extent. Following the DEFINE EXTENT command 30 is a LOCATE RECORD command 31 which establishes a write domain which defines the scope of the ensuing writing operation in the continuing chain of commands. LOCATE RECORD command 31 creates an operational domain for the upcoming write commands which originate in a channel processor portion of host processor 10 from chained channel command words (CCW) in a host processor memory. Various parameters are used in the known LOCATE RECORD command used by International Business Machines Corporation (hereafter IBM). Included in the LOCATE RECORD is the number of records or tracks to be processed, in the present description the number of records to be processed is used. It also includes the seek address, i.e., the location on DASD 20 of the first record in the write domain, search arguments, sector numbers, and transfer length factors may also be provided. In CKD record architecture the transfer length factor TLF is the number of bytes in each record in the file. The channel commands 30 and 31 instruct the peripheral subsystem 19 to set up for the upcoming write operation.

In IBM designed and built peripheral subsystems, the machine operations steps 32, et seq, of FIG. 2 represent the peripheral subsystem operations commanded by write commands. The LOCATE RECORD command 31 indicates the type of writing operation to be performed at machine operational step 32, whether or not the received write command in the chain a FORMAT WRITE operation is evaluated by microprocessor 14. If a FORMAT WRITE operation is to be performed the TLF is not required to be accurate for write domains. However, in a FORMAT WRITE, a known IBM peripheral operation, host processor 10 is aware of when switching occurs between tracks of DASD 20. Accordingly, host processor 10 issues a WRITE CKD NEXT TRACK command for switching to a next track. This command indicates that host processor 10 is commanding the peripheral subsystem to begin formatting a next or new track. Therefore, maximum available cache segments required for a FORMAT WRITE are those cache segments for storing one track of DASD data within the cache, as will become apparent from the machine operations shown in FIG. 3.

If at machine step 32 the commanded operation is not a FORMAT WRITE, rather an UPDATE WRITE, then the cache available segments have to be measured and compared with the size of the write domain defined in the LOCATE RECORD command 31. Since the peripheral subsystem controller is not aware of any fragmentation of the records identified in the LOCATE RECORD command of the current file to be processed, this situation requires a worst case calculation. To avoid unintended interruptions of the data transfer for maximizing channel utilization and preserving data integrity, a worst case situation of fragmentation is assumed. At machine step 33 the record size, i.e., the TLF is examined. It should be noted that the record lengths while being the same in each file can be radically different in different files.

The TLF is used in calculations to ascertain the number of cache segments required to store one record. By way of explanation, a track of DASD stores a predetermined amount of data in variably sized records. For example, the record length can be 250 bytes in one file, 10,000 bytes in another file and yet over 25,000 bytes in a third file. For cache efficiency, each cache segment stores a predetermined submultiple of the data storage capacity of each track. Such an arrangement is shown in Vosacek U.S. Pat. No. 4,499,539 wherein three cache segments were used to store the contents of one data track. In a constructed embodiment of the present invention, up to five cache segments are used to store a full set of data from one data track. It should be understood that three of the five segments can be completely full and two partially filled segments.

Figure 4:
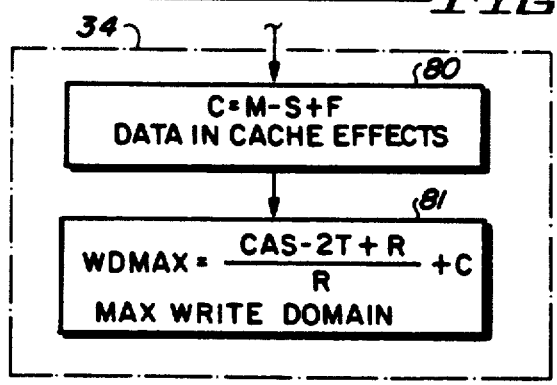
FIG. 4 is a simplified flow chart showing determination of required available cache segments for an update write data transfer in the FIG. 1 illustrated system.

At machine step 34, detailed in FIG. 4, the maximum size (WDMAX) of the write domain is calculated. Because of fragmentation the calculation assumes there will be one record stored per DASD track except that the last track in the write domain is a full track. The cache image of a DASD track is preferably a full track image. The first track in the write domain may have a partial track image beginning at a record circumferentially displaced from an index mark rather than the first record which is immediately adjacent and in that mark on the track. Therefore, a variable number of cache segments are required for storing in cache 16 the actual data contents of a DASD track. The cache storage requirements can be one segment and may be up to five segments. For small records, when a plurality of records are on a track, a plurality of records are stored in each of the cache segments. A worst case usage of the cache space is where only one record is stored in the cache segment and that record can be any size up to capacity of each cache storage segment. In any event, as will be detailed later, a maximum worst case write domain requirement on the cache is calculated a machine step 34. This maximum cache requirement arises from requiring storing data of a track starting with a record other then the first record on a track (record HA in CKD tracks) on a cache segment boundary and requiring that the first record HA be stored at a cache segment boundary.

Then, at machine-step 35, the calculated maximum number of segments is compared with the number of available cache segments (enough free cache space to store the records). If the number of available free cache segments is greater than or equal to the calculated maximum, then subsystem 19 is ready to receive data in the write domain. If not, the write domain data transfer has to be subsetted. As a result, in machine step 36 microprocessor 14 calculates the size of the maximum domain subset using a number of currently available cache segments as detailed in FIG. 5. Upon completing this calculation, the peripheral subsystem 19 is prepared to efficiently and safely respond to ensuing WRITE commands from the host processor 10 in the current chain of commands for writing data to DASD 20.

Each DASD 20 track having a copy of its stored data in the cache 16 is a separate allocation of cache space. A reason for further requirements is that the cache addressing is based upon addressing DASD 20 tracks. As a result, if only one record is recorded in one DASD track, one cache segment is allocated for storing a copy of the one record. If more than one record is in a DASD track, then all of the track records, if the records are small, could be stored in such one minimal cache allocation of one segment. From machine step 32 during a FORMAT WRITE or from step 35 or 36 during an update write, cache segments are allocated at step 37. Five segments (one track) are allocated for a FORMAT WRITE while the calculated maximum WDMAS (step 35 indicates "yes") or the maximum subset size (step 36) are allocated for an update write.

The receipt of a WRITE command is represented by numeral 40, the host processor 10 has sent a write command to be received by the FIG. 1 illustrated peripheral data storage subsystem. The explanation of the flow chart assumes that all of the operations are in accordance with the requirements set out in the preparatory channel commands 30, 31. If the WRITE command is a FORMAT WRITE at step 41, then the machine operations illustrated in FIG. 3 are performed as indicated by interpage connector A 42. If the command is not a FORMAT WRITE, then within the description of the present invention, it is an UPDATE WRITE. At machine step 43 microprocessor 14 ascertains whether or not the current chain of commands for writing data has to be subsetted, i.e., the maximum size of the write domain is greater than the number of available cache segments. If this situation exists, then the later described steps in FIG. 5 are performed and entered as indicated by off page connecter B 44. Whenever the number of available cache segments can store all of the data in the worst case usage of cache 16, then machine steps 45-51 are performed writing data to DASD 20. At machine step 45, the write command received at machine step 40 is initiated wherein one or more records are written to DASD 20 via rate changing buffer 13 and data circuits 16. Simultaneously to a record being read from rate-changing buffer 13 to DASD 20, a copy of such record is stored in cache 16 via bus 23. The storing of records in cache 16 may include overwriting data from the write domain already or currently stored in cache 16. Such a writing or cache hit is well known and the addressing and arrangement of cache segments for accommodating such a cache hit are well known and not further detailed for that reason.

A cache hit affects the calculation of the maximum cache utilization requirements. Such affects can be a decrease in the number of required cache segments for the UPDATE WRITE operation. Upon completing a writing of each record, microprocessor 14 at machine step 46 determines whether or not an "end of track" (EOT) has been reached by the record transfers from attachment circuits 11 to buffer 13, i.e., has a last record to be recorded in DASD 20 been received into buffer 13 in preparation for later recording in DASD 20 and cache 16. The end of track detection at the channel connection end of buffer 13 corresponds to and is later indicated by DASD 20 scanning an index mark 102 (FIG. 6) on the current track, as is known. It should be noted that since the current machine-operation is an UPDATE WRITE, if there is only one track of data to be written or one record is stored on a track, then only one record will be written during one rotation of a disk (not shown) of DASD 20. If the end of track is not reached and additional records are to be written on the current track being accessed, an additional record supplied by received WRITE commands at machine step 47 are written at machine step 45. However, between a last record which was previously recorded on the current track of DASD 20 and the index mark (EOT) no additional records are written to this DASD track. At the end of each track being written to, at machine step 50, the amount of data stored in cache 16, i.e., the number of cache segments actually used for storing the data used to update DASD 20 track is measured. If only one record was recorded on the current track then there are no excess cache segments as the maximum number of cache segments was required to store the records of the current track. On the other hand, if there were thirty records written to the current track, then those thirty records may be stored in two cache segments, for example. At maximum fragmentation, 34 cache segments were initially allocated for a write domain of 30 records, i.e., assuming one record per track. It is possible that only two cache segments were actually used for storing the updated data in cache 16, therefore the remaining thirty-two allocated cache segments are still available for storing other data. Such cache segments are termed excess segments and are deallocated at the each end of track when detected. Then, at machine step 51 whether the end of the write domain has been reached is detected as the most recent command is received via attachment circuits 11. This detection occurs before DASD 20 has received and stored all of the records of the write domain, i.e., is detected at the record transfer over bus 24 to buffer 13 rather than the record transfer over bus 22 to DASD 20. If not, machine steps 45, 46, 47 and 50 are repeated until the write domain ends at which time machine operations proceed over path 52 to other operations beyond the scope of the present description. From path 52, subsystem 19 may receive an additional LOCATE RECORD command whereupon machine steps 32 et seq are repeated. Parenthetically it is noted that at machine step 50 the deallocation of excess segments can vary from track to track, i.e., the number of records stored on each of the tracks in the defined extent of the file can vary. Vosacek in U.S. Pat. No. 4,499,539 shows a cache deallocation control for these purposes.

FIG. 3 shows the machine operations for effecting a FORMAT WRITE as entered from the FIG. 2 illustrated flow chart via off page connecter A 42. The LOCATE RECORD command 31 has indicated that the write commands are to format a track, i.e., write new count fields. At machine-step 60, the subsystem 19 determines whether the command is a WRITE CKD NEXT TRACK command. If not., then at machine-step 61 a record is received and stored in cache 16 and DASD 20. Step 61 includes supplying ending status to the host processor. Next at machine-step 62 the subsystem determines whether or not it is the end of the write domain or end of the chain. At the end of transfer, the procedure is exited via path 63. Otherwise the subsystem receives the next write command at machine-step 64, whereupon the FIG. 2 illustrated operations are repeated.

Upon receiving a WRITE NEXT TRACK command, at either of machine steps 40 or 64, at machine-step 65 the subsystem 19 determines and stores the number of available cache segments. At machine step 66 the subsystem 19 determines whether or not the number of available cache segments is sufficient for storing one track of data, i.e., five cache segments in the constructed embodiment. If yes, then the next DASD track is switched to and at step 67 five cache segments are allocated for receiving records from host processor 10 to FORMAT WRITE this next track on DASD 20. Steps 61, et seq, are then repeated. If the available cache segments are insufficient for storing data in the next DASD track, then at machine-step 70 the subsystem 19 sends a CCR to host processor 10. At machine-step 71 subsystem 19 defers the current set of machine-operations until the available cache segments are of sufficient number for storing data from a full track. At that point, in machine-step 72 a DEVICE END (DE) is sent to host processor 10 for indicating resending the just CCR'd command thereupon the command is received at machine step 64. From step 72, steps 64 and 60 et seq are repeated. From step 66, before executing step 61, cache segments for storing the data for the next track are allocated at step 67.

Referring next to FIG. 4, the calculation referred to in machine step 34 is detailed in two machine steps 80 and 81. A first calculation in step 80 relates to any data within the write domain stored in the cache and its effect on the utilization of the cache. In each file, all of the records are sequentially numbered from 1 (record 1 or R1) through record N or RN, where N is an integer. Record zero R0 in CKD is reserved for control purposes and not available for user data. A record stored in cache 16 which is being written to DASD 20 results in a cache hit during the write operation. Such cache hits can be predicted based upon the write domain defined in channel command 31. The maximum write domain size is increased whenever the first record in such write domain has a copy currently stored in cache. That is, the first referenced record and all subsequent records in the DASD track may be processed in the current write domain without additional allocation of cache 16 segments. The records in cache are initially assumed that they are stored one record per DASD track. The equations in step 80 at FIG. 4 shows the increase in write domain size C. M is the total number of records currently stored in the DASD track as a track cache image; the value S is a record number of the first record identified in the write domain by channel command 31 and F is the number of the first record in the track cache image.

Machine-step 81 calculates the maximum permitted domain size for a worst case fragmentation of the file on DASD 20. The maximum size (WDMAX) equals the cache available segments (CAS) less twice the number of cache segments required for a full track (in the illustrated embodiment T is equal to 5 making the subtractive value of step 81 equal to 10). To this difference is added the value R which is the number of cache segments required for each record. R is the quotient rounded to the next higher value of the value TLF divided by the cache segment capacity. The above-described quantity is then divided by R. The value C is then added to give the maximum size of the write domain expressed in a number of records.

FIG. 5 shows subsetting a data transfer in a write domain whenever the size of the required write domain WDSIZE is greater than the value WDMAX which indicates the maximum domain size which can currently be stored in available cache 16 segments. The size of the residual write domain is calculated in step 36 by subtracting the WDMAX value from WDSIZE.

Off page connecter B 44 shows machine operations flowing from the FIG. 2 illustrated set of machine-operations to machine step 90 whereat the subsystem receives a record of the step 40 received write command and stores the received record in cache and in DASD. Step 90 also increments a record count within microprocessor 14. Each time buffer 13 receives a record from attached circuits 11, microprocessor 14 stores the increments and stores the record count in its own internal memory (not shown). At machine step 91, at the channel connecting end of buffer 13 it is determined whether or not the data transfer is over, i.e., end of write domain or end of chain represented by host processor 10 supplying a last record to be recorded on DASD 20 and in cache 16. At this time DASD 20 and cache 16 have not yet received such last record in the write domain. If yes, the operation is exited as indicated by numeral 92. Otherwise, at machine step 93 microprocessor 14 determines whether or not the record count incremented at machine step 90 is equal to the value maximum determined by machine step 34. If the maximum number of records received is not the step 34 calculated maximum, then a write command is received at step 98 to repeat steps 90, 91 and 93. This loop is repeated until the maximum number is reached. Note that the counting is done for records transferred from attachment circuits 11 to rate-changing buffer 13 over bus 24.

Some subsystems 19 have a plurality of independent storage paths showing cache 16. Each storage path includes its own circuit in attachment circuits 11, its own rate-changing buffer 13 and data transfer circuits 18 and an independent access path to cache 16. Microprocessor 16 controls some or all of these storage paths. The number available cache segments for each storage path can be either from a common or shared pool of unallocated cache segments or from a pool of segments for each of the respective storage paths. In either instance, load balancing or need for such cache segments and current data transfer rates in the various storage paths can be effected. The controls of the present invention employ the same inventive principles in any event.

For subsetting the data transfer and the write domain, the FIG. 1 illustrated subsystem 19 at step 94 sends a CCR to host processor 10 to momentarily stop the data transfer. The subsystem CCR indicates to host processor 10 that the channel command just received, i.e., the channel write command immediately after the count reached the maximum, is rejected by the peripheral data storage subsystem. The CCR is in effect an external interrupt for interrupting the data transfer, i.e., channel 12 operations are on hold. In this instance, device operations continue until a sufficient number of available cache segments of cache 16 are made available. Accordingly, at machine step 95 microprocessor 14 determines whether or not there are sufficient cache segments available for storing a next track of data, i.e., five segments. If not, a wait loop consisting of repetitive executions of machine step 95 (wait loop may be interleaved with other operations, as is known) until at least five segments become available. At that point in time a device end (DE) is supplied to host processor 10 at machine step 96. Path 97 is followed to again execute steps 33 et seq. That is, the remainder of the write domain may require a maximum number of available cache segments which exceeds the current number of available segments. That is, additional subsetting may occur. The size of each subset can vary with the number of currently available cache segments. Such device end DE indicates to the host processor 10 that the peripheral subsystem has now reached a status whereat the data transfer may ensue. It is parenthetically noted that when track switches occur in this mode, there is no interruption per se of the data transfer as provided in the FORMAT WRITE operation. All of the above provides an efficient, effective machine control for ensuring writing to DASD 20 with minimal loss of disk rotation and that cache 16 can store a copy of all records.

Figure 6:
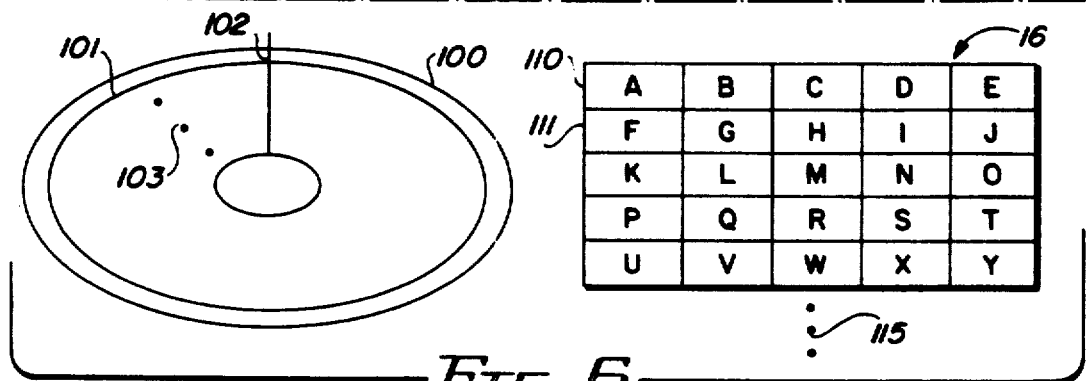
FIG. 6 diagrammatically illustrates cache utilization and allocation of data stored on a DASD track as used in the FIG. 1 illustrated system.

Cache utilization and the allocation of data stored on a DASD track is described with respect to FIG. 6. A disk 100 within a DASD 20 has a large plurality of data storing tracks, such as track 101. Track 101 begins and ends at index mark 102 which extends radially of the recording area on disk 100. Ellipses 103 indicates a large plurality of such tracks. Each of the tracks can store a variable amount of data and a variable number of records. In a maximal fragmented file some of the tracks 101, 103 store only one record. The next higher numbered record of the file is stored in the next track. A portion of cache 16 is logically shown as having a plurality of allocatable and addressable data storing segments A–Y. When a track 101 is full of data then it takes up to five of the segments to store one track as respectively denominated by numerals 110 and 111 respectively storing a track in segments A–E and in segments F–J. With a single record stored on a DASD track and being capable of being stored in a single one of the cache segments, then the entire DASD track contents can be stored in cache 16 in a single segment, such as in segment K. In yet another DASD track having a sufficient number of records for storing the track contents in three segments can be stored in segments P, Q and R for example. In this manner, a maximal utilization of cache 16 is obtained. In the maximum fragmentation situation described above, each DASD track is assumed to have but one record. Accordingly, one of the cache segments, assuming that one segment will store a single record, will be allocated for data for each of the tracks to be written into DASD 20. When the end of track is reached, such as at index 102, the peripheral subsystem 19 knows how many records were stored in an update write operation on a single track. For example, if eighteen records were stored in the cache segments represented by numeral 110 and they take four segments A–D then fourteen of the originally allotted eighteen segments of cache 16 are available for other machine operations. This procedure is repeated each time an end of track 102 is reached during a writing operation. This description presumes that the allocation of cache 16 is on a track basis and that the data stored in a given track of DASD 20 may take a variable amount of cache 16.

While the invention has been particularly shown and described with reference to preferred embodiments thereof, if will be understood by those skilled in the art that various changes in form and details may be made therein without departing from the spirit and scope of the invention:

What is claimed is:

1. In a machine-effected method of operating a cached peripheral data storage subsystem having a host processor channel means, a cache, both said host processor channel means and said cache being connected to a DASD, the method transferring data records between the DASD, the cache and the host processor channel means, including the machine-executed steps of:

in said cached peripheral data storage subsystem, establishing a write domain having a first predetermined number of data records to be stored on said DASD for an upcoming desired data transfer, the desired data transfer for transferring the first predetermined number of data records between said channel means and said DASD and for storing a copy of the first predetermined number of data records in the cache;

in the cached peripheral data storage subsystem and before transferring any of said records, determining and indicating a predetermined available cache storage for storing a second predetermined number of data records;

if the indicated available cache storage is less than that necessary for storing the first predetermined number of data records to be transferred in said desired data transfer, then, in the cached peripheral data storage subsystem, subsetting the desired data transfer into a given number of subsets of said second predetermined number of data records, limiting each said subset of data records to be not greater than the second predetermined number of data records; and then, in said cached peripheral data storage subsystem, separating the data transfer into a plurality of subset data transfers, before each subset data transfer, allocating a third predetermined number of said cache segments for storing the data records in each said subset data transfers, sequentially performing said given number of subset data transfers including said allocating step, each said subset data transfer for transferring a respective one of said subsets of data records between said channel means and said DASD including storing a copy of said subsets of data records in the available cache storage.

2. In the machine-effected method set forth in claim 1 further including the machine-executed steps of:

before establishing said write domain, establishing the cache to operate with allocatable cache segments, each of the allocatable cache segments having a first data storage capacity;

before establishing said write domain, establishing the DASD to have a plurality of data storing tracks, each of the tracks having a second data storage capacity which is about an integral multiple of the cache segment data storage capacity;

in said determining and indicating step finding any data records currently stored in a given cache segment of the cache having a same record identity as a record identity of a given data record in one of said subset data transfers, including said given cache segment in said available cache storage, then in said allocating step including said given cache segment in said allocated cache segment whereby the given data record stored in the cache is included in one of the cache segments allocated for receiving the given data record in said subset data transfer.

3. In the machine-effected method set forth in claim 1 wherein said DASD has a plurality of addressable data storing tracks, each said data storing track for storing a given number of said data records, further including the machine-executed steps of:

establishing said write domain to indicate a number of records of a file to be written to the DASD;

in said determining and indicating step, determining and indicating a maximum number of said cache segments required for storing the data records in said desired data transfer to be the first predetermined number of records in the write domain less one plus the number of cache segments required to store data records stored in one of said DASD tracks.

4. In the machine-effected method set forth in claim 1 wherein said DASD has a plurality of addressable data storing tracks, each said data storing track for storing a given number of said data records, said given number of data records being a second data storage capacity, further including the machine-executed steps of:

in each said subset data transfer, limiting the second predetermined number of records to be no greater than said given number of records that can be stored in one of said data storing tracks of said DASD;

upon transferring a plurality of said data records equal to said second data storage capacity, repeating the determining and indicating step for determining and indicating if the available cache storage can store records of said second data storage capacity, if the available cache storage can store data records equal to said second data storage capacity then executing a next one of said subset data transfers for continuing said desired data transfer, else, delaying said next one subset data transfer until said available cache storage has a sufficient number of cache segments for storing said given number of data records; and repeating the immediately above two recited steps until the desired data transfer is completed.

5. In the machine-effected method set forth in claim 1 wherein said DASD has a plurality of addressable data storing tracks, each said data storing track having a second data storage capacity, further including the machine-executed steps of:

providing a rate-changing buffer in said cached peripheral data storage subsystem, providing a channel means input-output end and a DASD input-output end on said rate-changing buffer, supplying all of the data records from the channel means that are to be recorded on the DASD to the channel means input-output end of said rate-changing buffer for temporary storage in the rate-changing buffer, then supplying a copy of the channel means supplied data records stored in the rate changing buffer from said DASD input-output end to the cache and to the DASD for storage therein;

at said channel means input-output end of the rate-changing buffer, detecting that current available cache storage is reduced below said second data storage capacity and indicating that the subset data transfer is to stop at an end of track address of a current track of the DASD data storing track receiving and storing the data records, addressing a data storing track of the DASD other than said current track for resuming the desired data transfer in a next one of the subset data transfers at a track of the DASD other than said current track; and after said detecting the subset data transfer is to stop at said end of track address and after said addressing a data storing track other than said current track, repeating the determining and indicating step for finding an available cache storage not less than said second data storage capacity.

6. In the machine-effected method set forth in claim 1 further including the machine-executed steps of:

consecutively numbering the data records in a file in a predetermined numbering sequence of record numbers;

establishing the write domain as a given continuous sequence of said record numbers beginning with a first given record number in said predetermined numbering sequence and ending with a second given record number wherein said first predetermined number of records are identified by said given continuous sequence of record numbers;

in said determining and indicating step, detecting a predetermined record of the file having a predetermined record number lower than said first given record number, then determining the number of records to be stored in the cache respectively identified by record numbers in said predetermined numbering sequence between said predetermined record number and said first given record number by subtracting the predetermined record number from said first given record number, then adding available cache storage to said allocated available cache storage for storing records of the file identified by said record numbers in said predetermined numbering sequence between said predetermined record number and said first given record number.

7. In the machine-effected method set forth in claim 1 further including the machine-executed steps of:

providing a rate-changing buffer having a channel input-output end and a device input-output end and supplying all of the data records from said host processor channel means to be recorded on said DASD to the channel end of said rate-changing buffer, then supplying a copy of said data records stored in the rate-changing buffer from said DASD end to the cache and to the DASD for storage therein; and performing said determining and indicating step at the channel end of the rate changing buffer.

8. In the machine-effected method set forth in claim 7 wherein said DASD has a plurality of data storing tracks, each of the data storing tracks having an end address, a current track being a one of the data storing tracks that is currently being accessed, further including the machine-executed steps of:

after said determining and indicating step and before a DASD access for recording the records therein reaches said end address of the current track, supplying additional records from the host processor channel means to the rate changing buffer such that a continuous flow of said data records continues through the rate-changing buffer when changing from said current track to a next data storing track.

9. In the machine-effected method set forth in claim 2 further including the machine-executed steps of:

after each said subset data transfer, determining which of the allocated cache segments did not receive data records; and deallocating said determined allocated cache segments.

10. In the machine-effected method set forth in claim 9 further including the machine-executed steps of:

providing a rate-changing buffer in said cached peripheral data storage subsystem, providing a channel input-output end and a device input-output end on said rate-changing buffer, then supplying all of the data records from said host processor channel means to be recorded on said DASD to the channel end of said rate-changing buffer, then supplying a copy of said data records stored in the rate-changing buffer from said device end to the cache and to the DASD for storage therein; and performing said determining and indicating step at the channel end of the rate changing buffer.

11. In the machine-effected method set forth in claim 10 wherein said DASD has a plurality of data storing tracks, each of the data storing tracks having an end address, a current track being a one of the data storing tracks that is currently being accessed, further including the machine-executed steps of:

after said determining and indicating step and before a DASD access for recording the records therein reaches said end address of the current track, supplying additional records from the host processor channel means to the rate changing buffer such that a continuous flow of said data records continues through the rate-changing buffer when changing from accessing said current track to accessing a next data storing track.

* * * * *

UNITED STATES PATENT AND TRADEMARK OFFICE
CERTIFICATE OF CORRECTION

| | |
|---|---|
| PATENT NO. : | 5,235,690 |
| DATED : | August 10, 1993 |
| INVENTOR(S) : | B. C. Beardsley, et al. |

It is certified that error appears in the above-identified patent and that said Letters Patent is hereby corrected as shown below:

At column 12, line 42, the words "of said records" should be --of said data records--.

Signed and Sealed this

Twelfth Day of April, 1994

*Attest:*

BRUCE LEHMAN

*Attesting Officer*  *Commissioner of Patents and Trademarks*